United States Patent
Hamalainen et al.

(10) Patent No.: US 8,942,169 B2
(45) Date of Patent: Jan. 27, 2015

(54) NETWORK COMPRISING A PRIVATELY OWNED BASE STATION COUPLED WITH A PUBLICLY AVAILABLE NETWORK ELEMENT

(75) Inventors: Jyri Kalervo Hamalainen, Oulu (FI); Ralf Irmer, Newbury (GB); Bernhard Raaf, Neuried (DE)

(73) Assignees: Nokia Siemens Networks Oy, Espoo (FI); Vodafone Group Services Limited, Newbury Berkshire (GB)

( * ) Notice: Subject to any disclaimer, the term of this patent is extended or adjusted under 35 U.S.C. 154(b) by 460 days.

(21) Appl. No.: 12/922,875

(22) PCT Filed: Mar. 13, 2009

(86) PCT No.: PCT/EP2009/052994
§ 371 (c)(1),
(2), (4) Date: Nov. 26, 2010

(87) PCT Pub. No.: WO2009/115462
PCT Pub. Date: Sep. 24, 2009

(65) Prior Publication Data
US 2011/0090839 A1   Apr. 21, 2011

(30) Foreign Application Priority Data

Mar. 18, 2008 (EP) .................... 08005060

(51) Int. Cl.
*H04W 4/00* (2009.01)
*H04L 12/28* (2006.01)
(Continued)

(52) U.S. Cl.
CPC ............. *H04W 28/08* (2013.01); *H04B 7/2606* (2013.01); *H04W 16/26* (2013.01); *H04W 84/045* (2013.01)
USPC .......................................... 370/328; 370/392

(58) Field of Classification Search
None
See application file for complete search history.

(56) References Cited

U.S. PATENT DOCUMENTS

| 5,533,027 A | 7/1996 | Akerberg et al. .......... 370/195.1 |
| 2001/0055300 A1* | 12/2001 | Chen .............................. 370/352 |

(Continued)

FOREIGN PATENT DOCUMENTS

| CN | 1108450 A | 9/1995 |
| CN | 1934884 A | 3/2007 |

(Continued)

OTHER PUBLICATIONS

U.S. Appl. No. 61/033,380, OFDMA-Based Cochannel Femtocell, Sahin et al., Mar. 3, 2008, pp. 9-12.*

(Continued)

*Primary Examiner* — Ashley Shivers
(74) *Attorney, Agent, or Firm* — Harrington & Smith

(57) ABSTRACT

It is described a telecommunication network. The telecommunication network includes a base station, which is privately owned and which is adapted to provide a restricted access service to a limited number of communication devices, which are assigned to a picocell of the telecommunication network. The telecommunication network further includes a network element, which is publicly available and which is adapted to provide unrestricted access service to communication devices, which are assigned to a wide area cellular network. The base station is coupled with the network element via a radio transmission link. It is further described a method for operating a telecommunication network of the above described type. Furthermore, it is described a base station and a network element, which in connection with each other represent the described telecommunication network and/or are adapted to carry out the described method for operating the telecommunication network.

20 Claims, 2 Drawing Sheets

(51) Int. Cl.
*H04W 28/08* (2009.01)
*H04B 7/26* (2006.01)
*H04W 16/26* (2009.01)
*H04W 84/04* (2009.01)

(56) References Cited

U.S. PATENT DOCUMENTS

| | | | |
|---|---|---|---|
| 2007/0189261 A1* | 8/2007 | Choi et al. | 370/347 |
| 2008/0085721 A1* | 4/2008 | Hirano et al. | 455/452.1 |
| 2008/0096553 A1* | 4/2008 | Saksena et al. | 455/426.2 |
| 2009/0088155 A1* | 4/2009 | Kim | 455/435.1 |
| 2009/0097448 A1* | 4/2009 | Vasudevan et al. | 370/331 |
| 2009/0221295 A1* | 9/2009 | Sahin et al. | 455/450 |
| 2009/0288144 A1* | 11/2009 | Huber et al. | 726/3 |

FOREIGN PATENT DOCUMENTS

| | | |
|---|---|---|
| EP | 0915577 | 5/1999 |
| EP | 1 241 903 A2 | 9/2002 |
| RU | 2146851 C1 | 3/2000 |
| RU | 2197782 C2 | 1/2003 |

OTHER PUBLICATIONS

Panasonic R1-082397, 3GPP TSG RAN WG1 Meeting #54, Warsaw, Poland, Jun. 30-Jul. 4m 2008, 6 pgs.

* cited by examiner

NETWORK COMPRISING A PRIVATELY OWNED BASE STATION COUPLED WITH A PUBLICLY AVAILABLE NETWORK ELEMENT

FIELD OF INVENTION

The present invention relates to the field of telecommunication networks. In particular, the present invention relates to a telecommunication network architecture, which comprises (a) at least one network element being assigned to a wide area cellular network and (b) at least one base station, which is privately owned and which is adapted to provide a restricted access service to a limited number of communication devices, which are assigned to a picocell of the telecommunication network. Further, the present invention relates to a method for operating a telecommunication network of the above described type. Furthermore, the present invention relates to a base station and to a network element, which in connection with each other represent the described telecommunication network and/or which in connection with each other are adapted to carry out the described method for operating the telecommunication network.

ART BACKGROUND

Relay stations or Relay Nodes have been proposed as coverage extensions in cellular systems for many years. After being carefully considered in pre-standardization activities, telecommunication systems employing Relay Nodes are achieving the level of maturity that is needed in ongoing standardization activities. Best evidence concerning to this maturity is the IEEE 802.16j standardization, where Relay Nodes are added on top of the IEEE 802.16e standard. This recent development has increased the pressure to consider Relay Nodes also in Long Term Evolution (LTE) standardization. In this respect it may be expected that due to reduced site costs the employment of Relay Nodes could provide an economically viable solution for increasing the performance of an LTE telecommunication network.

At present there are proposed many kinds of relay systems. The most simple relay systems carry out only an amplify/forward procedure wherein the signal being received from a Relay Node is only amplified and forwarded. More complex relay systems utilize a network coding in order to improve the overall performance. The most common relay system, which is proposed for cellular relaying, is a detect/forward respectively a decode/forward type of relay, where an input signal is detected and retransmitted using the same procedure as in the original transmission.

In the following, some characteristic features of Relay Nodes are listed:
- A Relay Node is connected to Wide Area Base Station, which controls some or even all operations of the Relay Node. The controlling Wide Area Base Station is often called a mother base station.
- A Relay Node operates preferably at the same carrier frequency or within the same carrier frequency bandwidth as the controlling Wide Area Base Station.
- In case of a radio link between a Relay Node and the controlling Wide Area Base Station the Relay Node consumes a part of the radio resources, which otherwise could be used for an access of communication devices.

FIG. 2 shows a macrocell 231 of a wide area cellular network. The macrocell 231 comprises a Wide Area Base Station 235, which represents a controlling base station for a plurality of Relay Nodes 231a, 231b, 231c, 231d, 231e, 231f and 231g. These Relay Nodes 230a-g are used in order to improve and/or to extend the coverage provided in the cell 231. Thereby, each Relay Node 230a-g is used because of a different reason.

The Relay Node 230a is used in order to overcome a coverage hole 231 of the controlling base station 235. Therefore, a mobile phone 233a, which represents a communication device being located within the coverage hole 231, can be operated in a known manner by using the Relay Node 230a.

The Relay Node 230b is used for improving the radio link between communication devices being located within a building 231b. Thereby, the Relay Node 230b helps the corresponding electromagnetic waves to penetrate into the building 231b.

The Relay Node 230c is used for extending the coverage of the Wide Area Base Station 235 towards a cell extension 231c being located at the edge of the cell 231. This allows a mobile phone 233c to communicate with the Wide Area Base Station 235.

The Relay Node 230d is used for providing coverage of the Wide Area Base Station 235 with valleys, which a located between buildings 231d.

The Relay Node 230e is used for providing coverage within the macrocell 231 also within the shadow of a building 231e. Thereby, a mobile phone 233e being located directly behind the building 231e can communicate with the Wide Area Base Station 235 via the Relay Node 230e.

The Relay Node 230f is used for extending the coverage of the Wide Area Base Station 235 towards a cell extension 231f being located outside the cell 231. This allows a mobile phone 233f to communicate with the Wide Area Base Station 235 via the Relay Node 230f.

The Relay Node 230g is used for extending the coverage of the Wide Area Base Station 235 towards a further cell extension 231g being also located outside the cell 231. As can be seen from FIG. 2, a mobile phone 233g being located within the cell extension 231g can communicate with the Wide Area Base Station 235 by means of a multi hop process, in which (a) the Wide Area Base Station 235, (b) the Relay Node 230f and (c) the Relay Node 230g are involved.

Growing interest to data services within telecommunication networks is expected to increase the data traffic in particular in the so called backhaul that is connecting a base station to a core network of the operator of the cellular telecommunication network. An introduction of Relay Nodes, which typically increase the cell sizes as well as the data traffic in particular in backhaul, makes this problem even more meaningful. Further, due to a high mobility of users respectively of communication devices, the load fluctuations especially within small cells will probably increase significantly. Therefore, it is expected that the load control within a cellular telecommunication network will get very difficult when Relay Nodes are widely used. As a consequence, an appropriate dimensioning of the transmission link between a Relay Node and the corresponding controlling Wide Area Base Station, which transmission link provides a wireless backhaul, might become cumbersome.

There may be a need for providing a telecommunication network and a method for operating the same, which allow for an improved load control within a cellular telecommunication network.

SUMMARY OF THE INVENTION

This need may be met by the subject matter according to the independent claims. Advantageous embodiments of the present invention are described by the dependent claims.

According to a first aspect of the invention there is provided a telecommunication network. The telecommunication network comprises (a) a base station, which is privately owned and which is adapted to provide a restricted access service to a limited number of communication devices, which are assigned to a picocell of the telecommunication network, and (b) a network element, which is publicly available and which is adapted to provide unrestricted access service to communication devices, which are assigned to a wide area cellular network. The base station is coupled with the network element via a radio transmission link.

The described telecommunication network is based on the idea that a wireless connection between the privately owned base station and the publicly available network element can be exploited in a positive manner by transmitting data in particular from the network element to the base station. Thereby, the communication devices, which are assigned to the wide area cellular network, may be located in and/or may be assigned to a macrocell of the telecommunication network.

The privately owned base station may be connected through a wired connection to a core network. This wired connection may be for instance a Digital Subscriber Line (DSL) or an Ethernet connection. Hence the privately owned base station provides a potential sink point and/or a source point for data traffic of the wide area cellular network, which represents an overlaying broadband wireless system. By contrast thereto, within known telecommunication network architectures a restricted access forms a barrier that prevents the direct use of this backhaul potential by other users or communication devices than those which have been granted an access right.

With the described telecommunication network the data load within the wide area cellular network can be effectively reduced by using the privately owned base station as a device which can effectively retrieve a data load from the wide area cellular network of the telecommunication network via a short wireless transmission link to the picocell. From the picocell the corresponding data can be further transmitted via a wired cable connection. Thereby the wired cable connection may comprise a metal conductor cable and/or an optical fiber cable.

The data load retrieval can be in particular effective if a plurality of privately owned base stations is available such that independent of the specific location of the network element there is always a privately owned base station available, which is in operation and which is located in close proximity to the network element.

It has to be pointed out that the described telecommunication network represents a network architecture, which completely contradicts to the common technical teaching in the field of telecommunication networks, which comprise at least one privately owned base station. Before the invention described in this application was made, it was commonly accepted that interferences respectively the radiative coupling between a privately owned base station of a picocell and network elements being assigned to a publicly available network should be minimized in order to prevent an unauthorized access to the privately owned base station. By contrast to this common technical teaching the telecommunication network described with this application takes benefit of a good wireless connection between the privately owned base station and the network element of the wide area cellular network. In this respect it is pointed out that the network element is not assigned to the picocell.

It has to be mentioned that the described radiative coupling between the privately owned base station and the network element may provide the advantage that both components may operate with the same or at least with a strong overlapping frequency bandwidth. By contrast thereto, in known telecommunication networks, which comprise at least one privately owned base station, a radiative coupling between the privately owned base station and publicly available network element is prevented by choosing different and preferably non overlapping frequency bandwidths for the privately owned base station and the publicly available network element. Thereby, each of these components can only operate within a reduced frequency bandwidth. Otherwise interference between the two may occur and may compromise the performance of at least one or more likely even both of these components. By contrast thereto, the components of the telecommunication network described with this application can operate within the full frequency bandwidth.

The privately owned base station may be a so called home base station or a corporate base station. Several of such corporate base stations may form a so called corporate network and they may be interconnected e.g. via a local LAN and also to the corporate internet access. This means that the privately owned base station is not a component of the wide area cellular network, in particular the privately owned base station may not be run by the operator of the wide area cellular network. In particular within a Long Term Evolution (LTE) network the privately owned base station may also be called a privately owned eNodeB. A base station which is strictly speaking owned by a network operator, but provided by the operator to the customer for deployment in his premises is also called "privately owned base station" in the context of this application.

The privately owned base station provides a restricted access. This may mean that only the owner or the owners of the privately owned base station and/or otherwise specified users are usually allowed to create a connection through the privately owned base station. This may also hold for the described network element, which might be considered as a trusted party of the privately owned base station.

The restricted access to a closed user group and/or to predefined communication devices may be achieved by a rights management system, which can be implemented in the privately owned base station. With such a rights management system it may be prevented for instance that an unauthorized user can use a private and/or a corporate owned printer, which represents a communication device being assigned to the picocell of the privately owned base station.

It has to be mentioned that the term picocell may refer to a wireless communication system typically covering a small area, such as in-building (offices, shopping malls, train stations, etc.). Sometimes such cells are also called femtocells. The privately owned base station respectively the picocell base station may be a low cost, small (for instance A4 paper size and about 2-3 cm thick) and reasonably simple unit that can connect to a Base station Controller (in a Global System for Mobile communications (GSM) network) and/or to a core network (in a Long Term Evolution (LTE) network).

According to an embodiment of the invention the maximal number of communication devices, which can be assigned to and/or served by the base station is smaller than the maximal number of communication devices, which can be assigned to and/or served by the network element.

This may mean that the privately owned base station is a less powerful device than the publicly available network element. This may also hold for the spatial coverage of these components of the described telecommunication network.

For instance, the privately owned base station may be designed for a maximal number of users respectively a maximal number of communication devices, which maximal number is between 5 and 20. Preferably, the maximal number is at least approximately 10. By contrast thereto, the publicly available network element may be designed for serving much more users respectively communication devices. The network element may be designed for serving a much higher number of users respectively communication devices, which number may be for instance 50, 100 or even higher.

According to a further embodiment of the invention the network element is a Relay Node.

At present Relay Nodes are frequently used (a) in order to extend the overall spatial coverage of a cell within the wide area cellular network and/or (b) in order to provide enhanced coverage in particular in hot spots or in shadowed areas. Therefore, in current cellular telecommunication networks, Relay Nodes represent widely distributed network elements, which in connection with privately owned base stations can be used for forming the telecommunication network described within this application. Therefore, the described telecommunication network may be realized with standard telecommunication devices simply by adapting the software of these components in order to allow for a wireless coupling between the privately owned base station and the Relay Node.

According to a further embodiment of the invention the telecommunication network further comprises a Wide Area Base Station, which is assigned to a cell of the wide area cellular network and which is coupled to the Relay Node.

The Wide Areas Base Station may be coupled with a core network via a wired cable connection. Thereby the wired cable connection may comprise a metal conductor cable and/or an optical fiber cable. This may allow for a fast and powerful connection to the core network without putting a load on overall radio transmission links.

The Relay Node may include means to communicate via a radio transmission link with both the Wide Areas Base Station and the privately owned base station. Thereby, the Wide Areas Base Station may represent a controlling base station for the Relay Node.

In known cellular wide area telecommunication networks all data traffic being related to a Relay Node also affects the controlling Wide Area Base Station. Thereby, depending on the amount of data traffic between (a) this Relay Node and (b) the communication devices being served by this Relay Node, there may be a significant data load on the connection between the Relay Node and the controlling Wide Area Base Station. Due to a high mobility of users of communication devices this data load may also exhibit strong time fluctuations. By contrast thereto, with the described intentional radiative coupling of the Relay Node and the privately owned base station at least a part of the data load between the Relay Node and the controlling Wide Area Base Station can be deflected respectively rerouted to the privately owned base station. This can be done permanently or temporarily when there is expected a high data load for instance due to a high number of communication devices which are currently served by the Relay Node.

It has to be mentioned that there may be employed a procedure by which the controlling Wide Area Base Station is informed by the Relay Node that a part or all packets of some data control portions are send through the privately owned base station. Further, the Relay Node may be adapted to forward some control information from the controlling Wide Area Base Station, which can also be called a mother base station, to the privately owned base station. Of course, control information may also be sent in the opposite direction from the privately owned base station to the Wide Area Base Station.

In other words, the described coupling between the Relay Node and the privately owned base station can help (a) to reduce the overall data load between the Relay Node and the controlling Wide Area Base Station and/or (b) to reduce the effect of temporal data load peaks and/or (c) reduce the necessary transmit power to or from the Relay Node for achieving a certain data rate and thus reduce the overall level of interference for the wide area network and/or one or multiple base stations in the proximity of the Relay Node. Since the described telecommunication network comprising the Relay Node and the privately owned base station can be established without any further technical devices, these benefits may be achieved simply by designing the Relay Node and/or the privately owned base station in such a manner, that these components can be coupled to each other. Thereby, it might be possible that this can be achieved simply by programming the Relay Node and/or the privately owned base station appropriately.

If the privately owned base station and the Wide Areas Base Station operate on different frequencies respectively different radio resources, then the Relay Node is able to utilize both of these resources. However, it is not necessary that the Relay Node is capable of applying both of these resources at the same time.

According to a further embodiment of the invention the Relay Node and the Wide Area Base Station are coupled via a radio communication link. The radio communication link may be realized by means of a point-to-point radio system.

In order to reduce the data load on the described radio communication link between the relay node and the Wide Area Base Station the privately owned base station may remove at least a part of the data load which is handled by the Relay Node. The corresponding data can be forwarded for instance via a cable connection to a core network, from which it can be further distributed to its destination address.

Using only a radio communication link between the Relay Node and its controlling Wide Area Base Station may provide the advantage that for a proper operation of the Relay Node only electrical power is needed. No data cables are necessary in order to provide for a data connection between the relay node and the Wide Area Base Station.

The radio communication link between the Relay Node and the Wide Area Base Station represents a so called wireless back-haul that ensure a high flexibility with respect to a proper location selection of the Relay Node. The Relay Node may be placed for instance at lamp posts. Thereby, the electrical power for the Relay Node can be taken from the electric power supply of the corresponding lamp.

The above described deflection respectively rerouting of at least a part of the data load from the controlling Wide Area Base Station towards the privately owned base station is in particular advantageous, if the Relay Node is coupled in a wireless manner with the controlling Wide Area Base Station. Thereby, the wireless radio communication link, which is typically less powerful than a wired communication link, can be relieved at least partially from a temporarily or permanently extensive data load.

It has to be mentioned that also one or multiple further Relay Nodes may carry data traffic to and from the wide area network through the Relay Node described above by employing a well known multiple hop procedure. The above described deflection respectively rerouting of at least a part of the data load from the controlling Wide Area Base Station towards the privately owned base station would then also apply accordingly.

According to a further embodiment of the invention the network element is a trusted party of the base station. This may mean that the privately owned base station can provide access both (a) to individuals that admit access rights and (b) to a precisely defined trusted party. In this context the trusted party can be any network element like a Relay Node that is part of the fixed infrastructure of a wide area cellular network.

The network element may be provided with a firewall. Thereby it can be effectively prevented that external user use the private network and/or unauthorized user encroach the private network.

By contrast to known configurations of privately owned base stations the configuration of the privately owned base station described with this application is extended in such a manner that under some conditions the privately owned base station may grant access to a trusted party. Here the term "under some conditions" may refer to a contract between the owner of the privately owned base station and the operator of the wide area cellular network. For instance the private owner and the operator may mutually agree with conditions under which the operator is allowed to access the privately owned base station as a trusted party. Such a contract may contain an arrangement in which the private owner receives some benefit from the operator when allowing a network element of the wide area cellular network a trusted party access.

In a preferable case the owner of the privately owned base station may lease, may rent or may obtain the privately owned base station from the network operator. Further, the private owner may get otherwise a bundled offer that includes on the one hand the hardware of the privately owned base station and on the other hand an agreement which gives at least one network element of the wide area cellular network the status of a trusted party.

According to a further embodiment of the invention the network element is provided with a security arrangement.

The security arrangement may be designed in such a manner that the network element guarantees that in addition to those communication devices, which are assigned to the picocell, only those communication devices, which have been defined as a trusted party, are able to access the privately owned base station.

Further, the security arrangement may also prevent any outside party to listen the data traffic that is sent from network element to the privately owned base station. This can be effectively achieved by encrypting the data traffic between the network element and the privately owned base station or a further element in the network to which the network element is connected eventually or indirectly. This may further provide the advantage that also a user of the picocell will not be able to intercept the data traffic at the privately owned base station.

Furthermore, there may be employed a special access protocol by which the privately owned base station and the network element identify each other. Thereby, the status of a trusted party may be assigned if all requirements of the special access protocol are fulfilled.

According to a further embodiment of the invention the telecommunication network further comprises a core network, which is coupled both to the base station and to the network element.

The core network may be coupled directly or indirectly with the privately owned base station respectively the network element. In case of an indirect coupling, connection elements like Access Gateways, Serving GPRS Support Nodes, Base Station Controllers and/or Mobile Switching Centers may be used.

The core network may be an IP based network. This may provide the advantage that the core network may by accessed via the Internet.

The described technical arrangement respectively the described telecommunication network with the core network being coupled both to the picocell and to the wide area cellular network may provide the advantage that a privately owned base station is used by the operator infrastructure of a wide area cellular network as an access point through which the network element may forward and/or receive data and control information to and/or from the operator's core network. Thereby, the radio system load may be reduced in a beneficial manner because in consideration of a plurality of privately owned base stations, which are typically available in particular in the future, these privately owned base stations may carry at least a significant portion of the radio system load by forwarding data packets by means of a wired connection between the respective privately owned base station and the operator's core network. A load balancing may be accomplished if the amount of forwarded data packets is chosen depending on the current radio system load. The load balancing can be accomplished centrally in the wide area network, or by means of a distributed mechanism involving the base station, the Relay Node and/or the wide area network.

According to a further embodiment of the invention at least the network element and the base station are adapted to establish a data tunnel between the network element and a further entity being coupled to the base station. In particular the data tunnel may be established between a Relay Node representing the network element and the further entity being coupled to the privately owned base station.

Preferably, the further entity is not assigned to the picocell. This may provide the advantage that there can be realized a high security level for the privately owned base station respectively for all communication devices being assigned to the picocell.

The data tunnel may for instance extent to the above described core network and/or to any other connection element like an Access Gateway, a Serving GPRS Support Node, a Base Station Controller or a Mobile Switching Center. The data tunnel may prevent both an unauthorized encroach into the picocell and also an unauthorized listening of the data traffic between the network element and the further entity by any one of the communication devices being assigned to the picocell.

According to a further embodiment of the invention the base station and/or the network element are adapted to limit a transmission of data between the base station and the network element to predefined services and/or predefined control information.

In a further embodiment of the invention control information between the network element and the wide area network is exchanged via the base station instead of using a direct wireless link between the network element and the wide area network. This could for example be an IP connection.

In this context, the term "data" might refer to user data as well as to control information, which might be exchanged between the network element and a further controlling entity for the network element. In particular, such control information might be exchanged between a Relay Node representing the network element and a Wide Area Base Station representing the controlling entity for the Relay Node. Thereby, it may be guaranteed that independent from the amount of user data traffic between the Relay Node and the Wide Area Base Station important control information to and/or from the Relay Node reliably reach the destination entity. Depending on the direction of the transfer of the control information the destination entity may be the Relay Node or the controlling Wide Area Base Station.

According to a further embodiment of the invention the network element is adapted to decide whether data are transmitted (a) via the radio transmission link between the network element and the base station or (b) via the network element to a further entity of the wide area cellular network.

The data may be for instance data comprising a certain quality requirement. Such a requirement may be a specification of a maximal allowable delay time. This may mean that the network element is adapted to decide how to handle delay critical data. Specifically, the network element may be adapted to decide about the spatial transmission path for delay critical data.

This may provide the advantage that for delay critical data the described telecommunication network may choose the fastest available transmission path to the respective destination entity. In case of a currently high data load within the wide area cellular network and/or a currently low data load within the picocell the radio transmission link to the privately owned base station, the privately owned base station may be used for the desired data transmission. In case of a currently low data load within the wide area cellular network and/or a currently high data load within the picocell a data transmission might be more effective, which data transmission at least in the beginning involves only components of the wide area cellular network.

According to a further embodiment of the invention the telecommunication network further comprises means for routing a user data signal and/or a control signal originating from the network element towards a destination entity.

The routing means may be realized for instance by a switch, which forwards the data having been transmitted via a data tunnel from the Relay Node representing the network element via the privately owned base station to the switch. The switch may forward these data to the desired destination address. The destination address may be for instance a further private base station or any other Internet Protocol (IP) address within or outside a core network of the described telecommunication network.

According to a further embodiment of the invention the network element is adapted to provide a synchronization signal to the base station. This may mean that in addition to a forwarding of user data and/or a control signal the network element may also provide a synchronization service for the privately owned base station. By contrast to a known synchronization of privately owned base stations, which in the absence of an utilizable GPS signal in particular within buildings is typically carried out with a DSL timing reference signal, the described synchronization via the radio transmission link between the privately owned base station and the network element is much more precise. Therefore, the provided synchronization service may enhance the interference control respectively the management opportunity between different privately owned base stations and/or between a privately owned base station and a Wide Area Base Station of the wide area cellular network in case the Wide Area Base Station and the network element are synchronized.

According to a further aspect of the invention there is provided a method for operating a telecommunication network. The method comprises the step of transmitting data between a base station and a network element via a radio transmission link. Thereby, the base station is privately owned and is adapted to provide restricted access service to a limited number of communication devices, which are assigned to a picocell of the telecommunication network. Further, the network element is publicly available and is adapted to provide unrestricted access service to communication devices, which are assigned to a wide area cellular network.

The described method for operating a telecommunication network is based on the idea that a wireless connection between the privately owned base station and the publicly available network element can be exploited in a positive manner in order to reduce an overall and/or a preliminary data load within the wide area cellular network by using the privately owned base station as a device which can effectively retrieve a data load from the wide area cellular network of the telecommunication network via a short wireless transmission link to the picocell. From the picocell the corresponding data can be further transmitted via a wired cable connection representing typically a more powerful transmission link than a wireless link.

The privately owned base station may be connected through a wired connection to a core network. This wired connection may be for instance a DSL or an Ethernet connection. Hence the privately owned base station provides a potential sink/source point for data traffic of the overlaying broadband wireless system.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

According to a further aspect of the invention there is provided a base station, (a) which is privately owned, (b) which is adapted to provide a restricted access service to a limited number of communication devices being assigned to a picocell of a telecommunication network, and (c) which is further adapted to couple via a radio transmission link with a network element, which is publicly available and which is adapted to provide unrestricted access service to communication devices being assigned to a wide area cellular network.

This aspect of the invention is based on the idea that in addition to providing access for a closed user group the described privately owned base station can on top provide access for a specific publicly available network element. Thereby, the described communication devices may be assigned to the closed user group.

Preferably, the network element may be a trusted party of the privately owned base station. Known procedures for mutual agreeing as a trusted party may be used. Such procedures are widely known in the field of protected data links and will not be described in this application in further details.

The network element as a trusted party may have full or limited rights with respect to the picocell. In particular, the network element may be prevented to communicate with the communication devices of the picocell. However, the network element may be allowed to establish a secure data tunnel via the privately owned base station to a further entity being coupled to the privately owned base station. In particular the data tunnel may be established between a Relay Node representing the network element and the further entity.

In this context it has to be mentioned that by contrast to the network element the communication devices being assigned to the picocell are not a trusted party of the privately owned base station. These communication devices are rather registered individually with the privately owned base station.

According to a further aspect of the invention there is provided a network element, (a) which is publicly available, (b) which is adapted to provide unrestricted access service to communication devices being assigned to a wide area cellular network, and (c) which is further adapted to couple via a radio transmission link with a base station, which is privately owned and which is adapted to provide a restricted access service to a limited number of communication devices being assigned to a picocell of a telecommunication network.

This aspect of the invention is based on the idea that in addition to providing an unrestricted access service for communication devices being assigned to a wide area cellular network, the network element is also able to communicate with a privately owned base station. Thereby, the network element may be a trusted party of the privately owned base station, which may have full or limited rights with respect to the picocell. In particular, the network element may be prevented to communicate with communication devices of the picocell. However, the network element may be allowed to establish a secure data tunnel via the privately owned base station to a further entity being coupled to the privately owned base station. In particular the network element may be a Relay Node such that the corresponding data tunnel may be established between the Relay Node and the further entity.

It has to be mentioned that all features mentioned above with respect to the telecommunication network and the method for operating a telecommunication network can also be applied to the network element and/or the privately owned base station. Further, known privately owned base stations and publicly available network elements may be modified simply by applying an appropriate programming in order to represent a base station respectively a Relay Node in accordance with at least one embodiment of the present invention.

It has to be further mentioned that the above described wireless links between the base station and the network element, between the network element and the wide area network, and between a user device and any of the before mentioned entities can be accomplished in licensed and/or unlicensed bands. The same or different air interfaces or standards can be used for the wireless links described above.

The aspects defined above and further aspects of the present invention are apparent from the example of embodiment to be described hereinafter and are explained with reference to the example of embodiment. The invention will be described in more detail hereinafter with reference to an example of embodiment but to which the invention is not limited.

DETAILED DESCRIPTION

Figure 1:
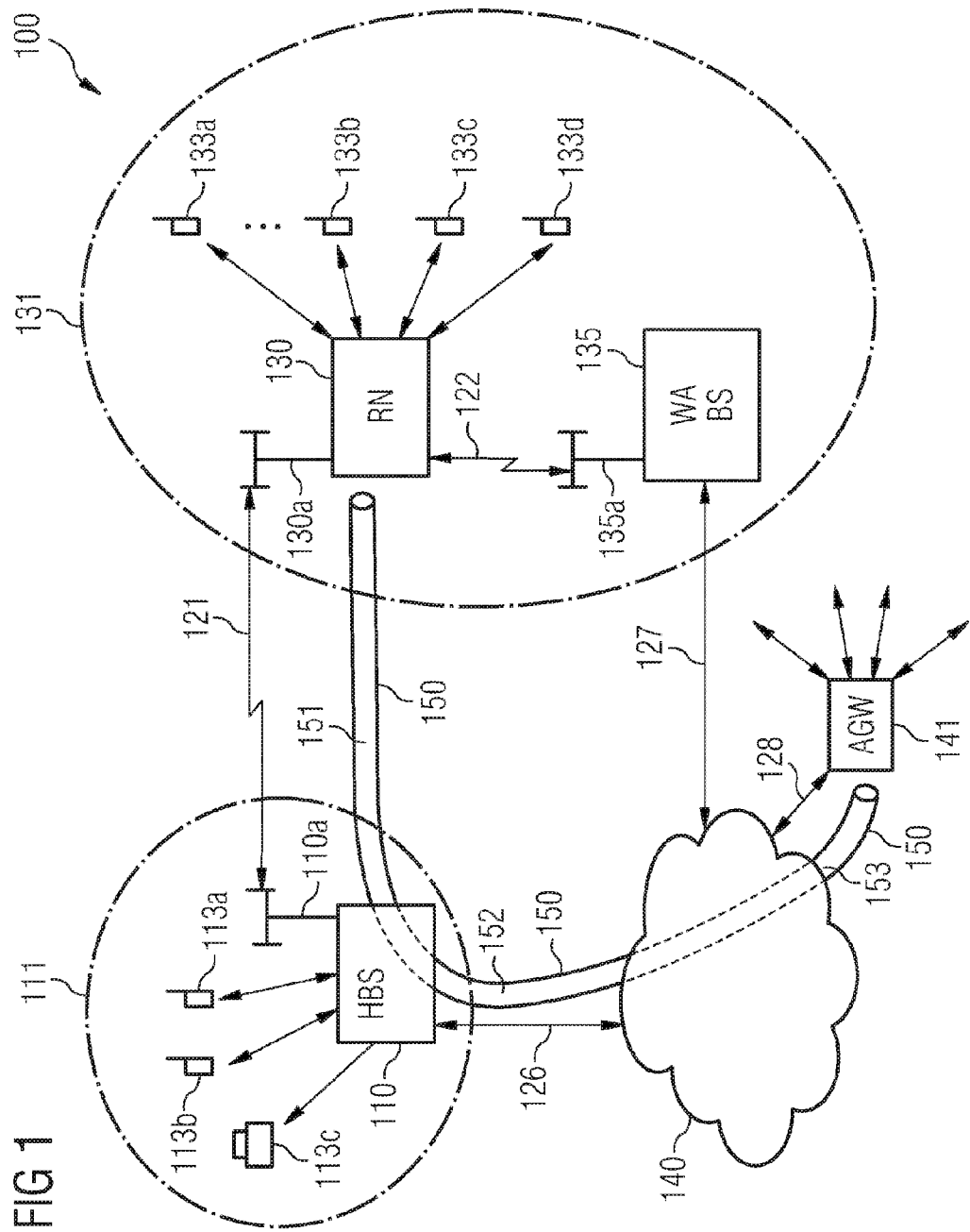
FIG. 1 shows a telecommunication network which comprises a data tunnel between a Relay Node of a wide area cellular network and an Access Gateway, wherein the data tunnel runs via a privately owned base station of a picocell of the telecommunication network.
Figure 2:
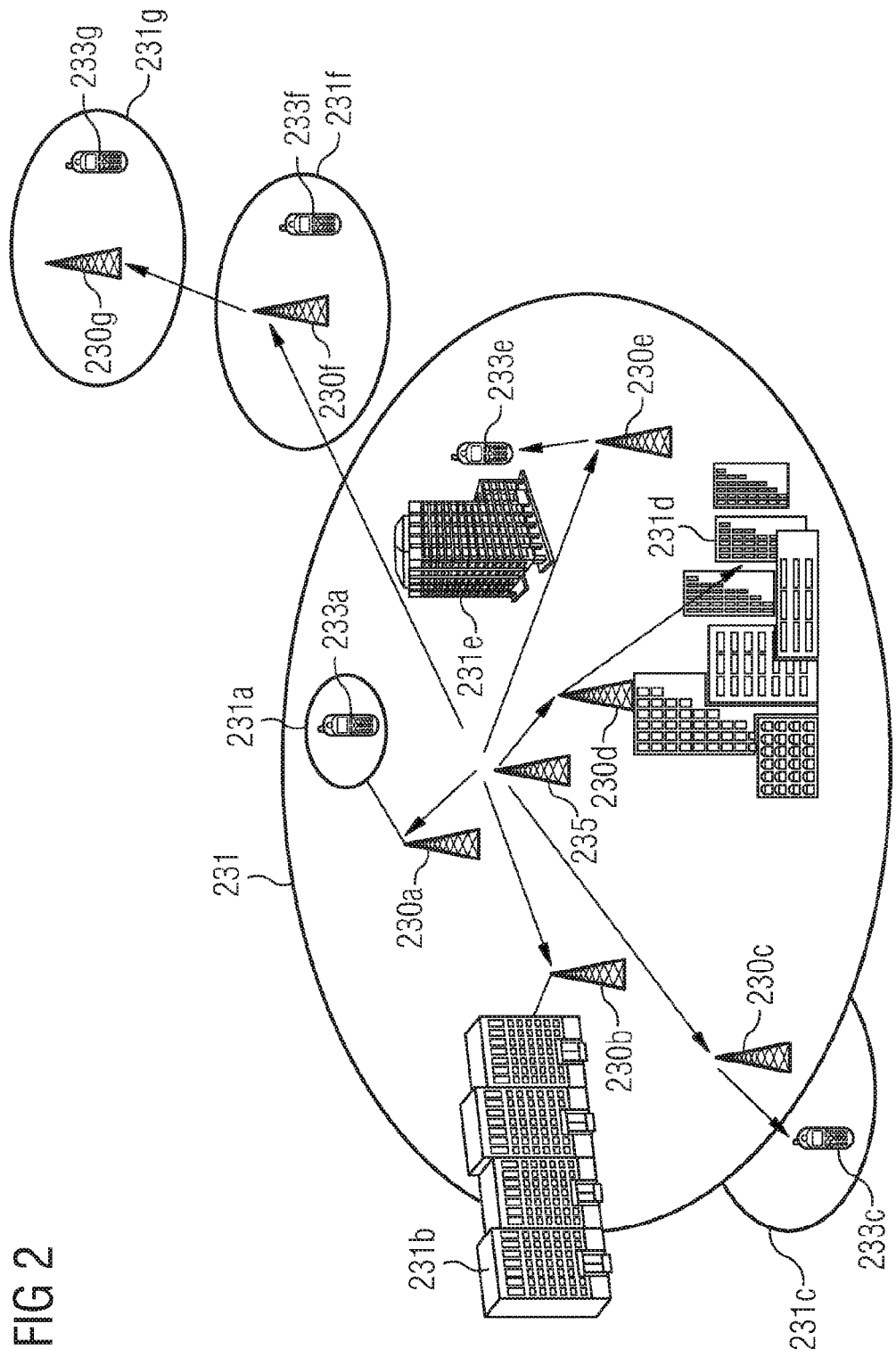
FIG. 2 shows a macrocell of a wide area cellular network comprising a Wide Area Base Station which is controlling a plurality of Relay Nodes in order to improve and to extend the cell coverage.

The illustration in the drawing is schematically. It is noted that in different figures, similar or identical elements are provided with the same reference signs or with reference signs, which are different from the corresponding reference signs only within the first digit.

FIG. 1 shows a telecommunication network 100 representing a preferred embodiment of the present invention. The telecommunication network 100 comprises a privately owned base station 110 and a network element 130 of a wide area cellular network. According to the embodiment described here the network element is a Relay Node 130, which is controlled by a Wide Area Base Station 135 of a Long Term Evolution network. The Relay Node 130, which is indicated in FIG. 1 by the abbreviation "RN" and the controlling Wide Area Base Station 135, which is indicated in FIG. 1 by the abbreviation "WABS" are coupled with each other in a wireless manner via a radio transmission link 122. The radio transmission link 122 extends between an antenna 135a of the Wide Area Base Station 135 and an antenna 130a of the Relay Node 130.

The wide area cellular network 100 comprises a macrocell 131. The Wide Area Base Station 135 and the Relay Node 130 are assigned to the cell 131. The wide area cellular network further comprises a plurality of communication devices 133a, 133b, 133c, 133d and 133e, which are served by the Relay Node 130. According to the embodiment described here the communication devices 133a-d are mobile phones. However, the communication devices 133a-d might also be any other user equipment such as a notebook computer, a Personal Digital Assistant (PDA) or any other mobile device which is capable of communicating with the Relay Node 130 and/or with the Wide Area Base Station 135.

The wide area cellular network 100 further comprises a picocell 111. The privately owned base station 110 and several communication devices 113a, 113b and 113c, which are served by the privately owned base station 110, are assigned to the cell 111. The privately owned base station 110 may be located in a Home of a family or in the building of a company. In FIG. 1 the privately owned base station 110 is indicated with the abbreviation "HBS". According to the embodiment described here the communication devices 113a and 113b are mobile phones and the communication device 113c is a printer.

As can be seen from FIG. 1, the described communication network 100 further comprises a core network 140, which is coupled to the privately owned base station 110 by means of a wired transmission link 126. The core network 140 may be any type of network. In particular, the core network 140 may be an IP based network such as the Internet. In FIG. 1 the Access Gateway 141 is indicated with the abbreviation "AGW". As can be further seen from FIG. 1, the core network 140 is coupled (a) to an Access Gateway 141 via a further wired transmission link 128 and (b) to the Wide Area Base Station 135 via a wired transmission link 127.

Via the Access Gateway 141 the described communication network 100 can be coupled to further network elements and/or to further networks, which for the sake of clarity are not depicted in FIG. 1.

The wireless connection between the Relay Node 130 and the privately owned base station 110 provides the possibility that the privately owned base station 110 can take over at least a part of the data traffic, which in absence of the privately owned base station 110 would load the radio transmission link 122 between the Relay Node 130 and the controlling Wide Area Base Station 135. This means that the privately owned base station 110 acts as a device which can effectively retrieve data traffic from the macrocell 131 via a short wireless transmission link 121 to the picocell. Such a retrieval can be particularly advantageous if a plurality of communications devices a currently served by the Relay Node 130 such that the corresponding user data via the wireless backhaul can be effectively reduced. Since the Wide Area Base Station 135 is connected to further non depicted network elements and/or to the core network 140 by means of a wired connection, in the embodiment described here the wireless back-haul is the radio transmission link 122, which of course has a limited capacity for transmitting data.

As can be seen from FIG. 1, the data being retrieved from the Relay Node 130 via the privately owned base station 110 can be transmitted back directly to the Wide Area Base Station 135 via the wired transmission link 127 and/or can be forwarded to the Access Gateway 141, from which they can be further transmitted to further network elements and/or to further networks, which are not depicted in FIG. 1 and which may represent the destination address of the corresponding data packets.

In case the retrieved data are directly transmitted from the core network 140 to the Wide Area Base Station 135, the privately owned base station 110 can be interpreted as a part of a data connection representing a bypass for the radio transmission link 122.

According to the embodiment described here there is established a data tunnel 150 extending between the Relay Node 130 and the Access Gateway 141. This data tunnel 150 runs via the privately owned base station 110 and the core network 150. The data tunnel 150 has the effect, that an unauthorized encroach into the picocell 111 for instance by one of the communication devices 133a-d is prevented. Further, an unauthorized listening of the data traffic via the radio transmission link 121 by means of for instance one of the communication devices 113a and 113b is also not possible.

It has to be mentioned that according to the embodiment described here the data tunnel 150 comprises three sections. A first section 151 is established by means of the radio transmission link 121, a second section 152 is established by means of the wired transmission link 126 and a third section 153 is established by means of the wired transmission link 128. This means that only one end of the data tunnel 150 is based one a wireless radio transmission. This may provide the advantage that only the first section 151 represents a bottleneck of the data tunnel 150 with respect to the data rate, which can be transmitted via the data tunnel 150.

It has to be mentioned that in FIG. 1 a telecommunication network architecture is described, which comprises an interaction between a Long Term Evolution network respectively a Relay Node of the Long Term Evolution network and a privately owned base station. However, the basic idea of an intentional radiative coupling between the Relay Node 130 and the privately owned base station 110 is also applicable for other radio network technologies such as GSM, cdma2000, or Wireless LAN (WLAN). Further, the basic idea described in this application is also applicable on a system based on (a) the Worldwide Interoperability for Microwave Access (WiMAX), which is described for instance in the standard IEEE 802.16e, IEEE 802.16j and IEEE 802.16m or (b) Ultra Mobile Broadband (UMB) which is described in the 3gpp2 standard family.

It should be noted that the term "comprising" does not exclude other elements or steps and "a" or "an" does not exclude a plurality. It should also be noted that reference signs in the claims should not be construed as limiting the scope of the claims.

List of Reference Signs
100 telecommunication network
110 privately owned base station
110a antenna
111 picocell
113a-c communication devices
121 radio transmission link
122 radio transmission link
126 wired transmission link
127 wired transmission link
128 wired transmission link
130 network element/Relay Node
130a antenna
131 macrocell
133a-d communication devices/mobile phones
135 Wide Area Base Station/controlling base station
135a antenna
140 core network
141 Access Gateway
150 data tunnel
151 first section (wireless)
152 second section (cable)
153 third section (cable)
230a-g Relay Node
231 macrocell
231a coverage hole
231b building
231c cell extension at cell edge
231d buildings with valleys
231e building
231f cell extension outside cell
231g cell extension outside cell (multihop)
233a-d communication devices/mobile phones
235 Wide Area Base Station/controlling base station

The invention claimed is:

1. A base station comprising:
one or more processors and one or more memories including computer program code, the one or more memories and the computer program code being configured, with the one or more processors, to cause the base station to perform at least the following:
providing a restricted access service to communication devices, which are assigned to a picocell of a telecommunication network, wherein the base station is privately owned;
communicating with a first network element, which is publicly available and which provides unrestricted access service to second communication devices which are assigned to a second cell of the telecommunication network;
communicating with a second network element controlling the second cell; wherein the base station is coupled with the first network element via a first radio transmission link, and at least a part of the traffic to or from the second communication devices is deflected from a second radio transmission link between the first network element and the second network element, and
routing said part of the data traffic via the first radio transmission link to one or more destination addresses.

2. The base station according to claim 1, wherein the maximal number of communication devices which can be assigned to and/or served by the base station is smaller than the maximum number of communication devices which can be assigned to and/or served by the first network element.

3. The base station according to claim 1, wherein the first network element is a Relay Node.

4. The base station according to claim 3, wherein the second network element is a Wide Area Base Station which is assigned to a cell of the wide area cellular network and which is coupled to the Relay Node.

5. The base station according to claim 4, wherein the Relay Node and the Wide Area Base Station are coupled via a radio communication link.

6. The base station according to claim 1, wherein the first network element is a trusted party of the base station.

7. The base station according to claim 1, wherein the first network element is provided with a security arrangement.

8. The base station according to claim 1, further comprising a core network which is coupled both to the base station and to the first network element.

9. The base station according to claim 1, wherein at least the first network element establishes a data tunnel between the first network element and a further entity being coupled to the base station.

10. The base station according to claim 1, wherein the base station and/or the first network element limit a transmission of data between the base station and the first network element to predefined services and/or predefined control information.

11. The base station according to claim 1, wherein the first network element decides whether data are transmitted:
   (a) via the first radio transmission link between the first network element and the base station, or
   (b) via the first network element and the second network element of the wide area cellular network.

12. The base station according to claim 1, further comprising a mechanism for routing a user data signal and/or a control signal originating from the first network element towards a destination entity.

13. The base station according to claim 1, wherein the base station receives a synchronization signal from the first network element.

14. A method comprising:
   transmitting data between a base station and a first network element via a first radio transmission link and between the first network element and a second network element, wherein the base station is privately owned and provides restricted access service to first communication devices which are assigned to a picocell of a telecommunication network;
   providing unrestricted access service from the first network element to second communication devices which are assigned to a second cell of the telecommunications network, wherein the first network element is publicly available;
   controlling the second cell using the second network element;
   coupling the base station with the first network element via the first radio transmission link; and
   deflecting at least a part of the traffic to or from the second communication devices from a second radio transmission link between the first network element and the second network element, wherein said part of the data traffic is routed via the first radio transmission link and the base station to one or more destination addresses.

15. A base station comprising:
   one or more processors and one or more memories including computer program code, the one or more memories and the computer program code being configured, with the one or more processors, to cause the base station to perform at least the following:
      providing a restricted access service to first communication devices being assigned to a picocell of a telecommunication network, wherein the base station is privately owned;
      coupling via a first radio transmission link with a network element which is publicly available and which provides unrestricted access service to second communication devices being assigned to a second cell of the telecommunication network;
      receiving data traffic to or from one or more second communication devices, said data traffic being deflected from a second radio transmission link between the first network element, and a second network element, the second network element controlling the second cell, and
      routing said data traffic via the first radio transmission link to one or more destination addresses.

16. A network element comprising:
   one or more processors and one or more memories including computer program code, the one or more memories and the computer program code being configured, with the one or more processors, to cause the network element to perform at least the following:
      providing unrestricted access service to communication devices being assigned to a macrocell, wherein the network element is publicly available; and
      coupling via a first radio transmission link with a base station which is adapted to provide a restricted access service to a limited number of communication devices being assigned to a picocell of a telecommunication network;
      wherein at least part of the traffic to or from the communication devices is deflected from a second radio transmission link between the network element and a second network element, the second network element controlling the macrocell, and
      wherein said part of the data traffic is routed via the first radio transmission link and the base station to one or more destination addresses.

17. The network element according to claim 16, wherein the maximal number of communication devices which can be assigned to and/or served by the base station is smaller than the maximum number of communication devices which can be assigned to and/or served by the network element.

18. The network element according to claim 16, wherein the network element comprises a Relay Node.

19. The network element according to claim 16, wherein the network element is a trusted party of the base station.

20. The network element of claim 16, wherein the network element further performs establishing a data tunnel between the network element and a further entity being coupled to the base station.

* * * * *